United States Patent [19]
Misoo et al.

[11] Patent Number: 5,863,645
[45] Date of Patent: Jan. 26, 1999

[54] COMPOSITE MICROPOROUS POLYOLEFIN MEMBRANE AND A METHOD OF PRODUCING THE SAME

[75] Inventors: Kunio Misoo; Kohji Ohbori; Noritaka Shibata, all of Toyohashi, Japan

[73] Assignee: Mitsubishi Rayon Co., Ltd., Tokyo, Japan

[21] Appl. No.: 676,255

[22] PCT Filed: Jan. 17, 1995

[86] PCT No.: PCT/JP95/00043

§ 371 Date: Jun. 17, 1996

§ 102(e) Date: Jun. 17, 1996

[87] PCT Pub. No.: WO95/19219

PCT Pub. Date: Jul. 20, 1995

[30] Foreign Application Priority Data

Jan. 17, 1994 [JP] Japan .................................. 6-003298

[51] Int. Cl.$^6$ ........................... B01D 69/08; B01D 69/12; B01D 71/26; B01D 71/38
[52] U.S. Cl. .................................. 428/314.2; 210/321.89; 210/491; 210/500.23; 264/41; 264/210.7; 264/210.8; 264/288.8; 427/245; 428/315.9; 428/316.6; 428/319.3; 428/376; 428/398; 428/902; 428/910
[58] Field of Search .............................. 428/314.2, 316.6, 428/319.3, 376, 398, 902, 910, 315.9; 427/245; 210/321.89, 490, 491, 500.23; 264/41, 210.7, 210.8, 288.8

[56] References Cited

U.S. PATENT DOCUMENTS

| | | | |
|---|---|---|---|
| 4,384,023 | 5/1983 | Okamura et al. ........................ | 428/338 |
| 4,401,567 | 8/1983 | Shindo et al. ........................ | 210/500.2 |
| 4,530,809 | 7/1985 | Shindo et al. ........................ | 264/210.7 |
| 4,808,315 | 2/1989 | Manabe et al. ........................ | 210/645 |
| 5,084,173 | 1/1992 | Nitadori et al. ........................ | 210/321.89 |

FOREIGN PATENT DOCUMENTS

| | | |
|---|---|---|
| 57-66114 | 4/1982 | Japan . |
| 62-44060 | 9/1987 | Japan . |
| 62-269706 | 11/1987 | Japan . |
| 3-70539 | 11/1991 | Japan . |

*Primary Examiner*—Marion E. McCamish
*Assistant Examiner*—Blame R. Copenheaver
*Attorney, Agent, or Firm*—Pillsbury, Madison & Sutro LLP; Cushman Darby & Cushman Intellectual Property Group

[57] ABSTRACT

The present invention is related to a composite microporous polyolefin membrane having a high separation, a high flux and a high strength, comprising a microporous layer, b-layer, providing a reinforcing function, the b-layer being stacked on at least one surface of a microporous layer, a-layer, providing a separate function, wherein micropores in a-layer and b-layer are mutually interconnected inside of the layer and also between layers, thereby forming micropores connected from one surface of the membrane to the other surface thereof, and the ratio of the mean distance Da between microfibril bundles of micropores existing in a-layer to the mean distance Db between microfibril bundles of micropores existing in b-layer is in the range of $1.3 \leq Db/Da \leq 15$, and furthermore all of the inner and the outer surfaces of the composite membrane and the surface inside of micropores are coated by a thin film of a hydrophilic copolymer.

15 Claims, 4 Drawing Sheets

COMPOSITE MICROPOROUS POLYOLEFIN MEMBRANE AND A METHOD OF PRODUCING THE SAME

FIELD OF THE INVENTION

This invention relates to a composite microporous polyolefin membrane, which is effectively used in ultra-filtration and precision filtration, and to a method of producing the same. Specifically, this invention relates to a composite microporous polyolefin membrane having a high separation capability and a high film strength, and comprising a microporous polyolefin layer, having a function of reinforcing the film strength, being bonded to at least one surface of a microporous polyolefin layer having the function of separation and to a method of producing the same.

DESCRIPTION OF THE PRIOR ART

Microporous membranes are used in a wide variety of applications comprising industrial applications such as a treatment of industrial wastes, a treatment of processing water used in industrial applications, a production of ultra-pure water and the like, and air purification applications such as air filters, bag filters and the like.

A large number of polymer materials have been studied and various membranes have been developed as materials for microporous membranes. For example, Japanese Patent Laid-Open Publication Sho.57-66114 discloses a polyethylene porous hollow fiber membrane having a uniform microporous structure in the thickness direction of the membrane, wherein slit-like micropores comprising microfibrils oriented in the fiber lengthwise direction and knotted portions of stacked lamella oriented in the thickness direction are stacked inside of membrane walls of hollow fiber membrane, and whereby one surface of the membrane is communicating with the other surface of the membrane.

The membrane is manufactured by a melt forming of polyethylene followed by a further stretching of the formed body. In another word, a microporous membrane having the above-mentioned specific structure is formed by steps comprising, subjecting polyethylene to an annealing treatment after being formed under a specific spinning condition, forming crystals composed of stacked lamella (hereinafter referred to "stacked lamella") inside of membrane walls of the formed body, then stretching the formed body thereby increasing the distance between these lamella and promoting the growth of fibrils connecting each crystal of stacked lamella. The membrane having the above specific structure is characterized by that it has an excellent mechanical strength and is also high in safety because no solvent is used in the manufacturing process.

However, the microporous polyolefin membrane thus obtained by the above-mentioned method has a structure wherein stacking structure of micropores is uniform in the thickness direction of the membrane. The data disclosed in the experiments show that the mean pore diameter of the membrane is 0.82 $\mu$m (measured by a mercury porosimeter), and the water permeability is 4.2 $l/m^2 \cdot hr \cdot mmHg$. Although the water permeability of the membrane is large, separation characteristic is not sufficient.

Figure 4:
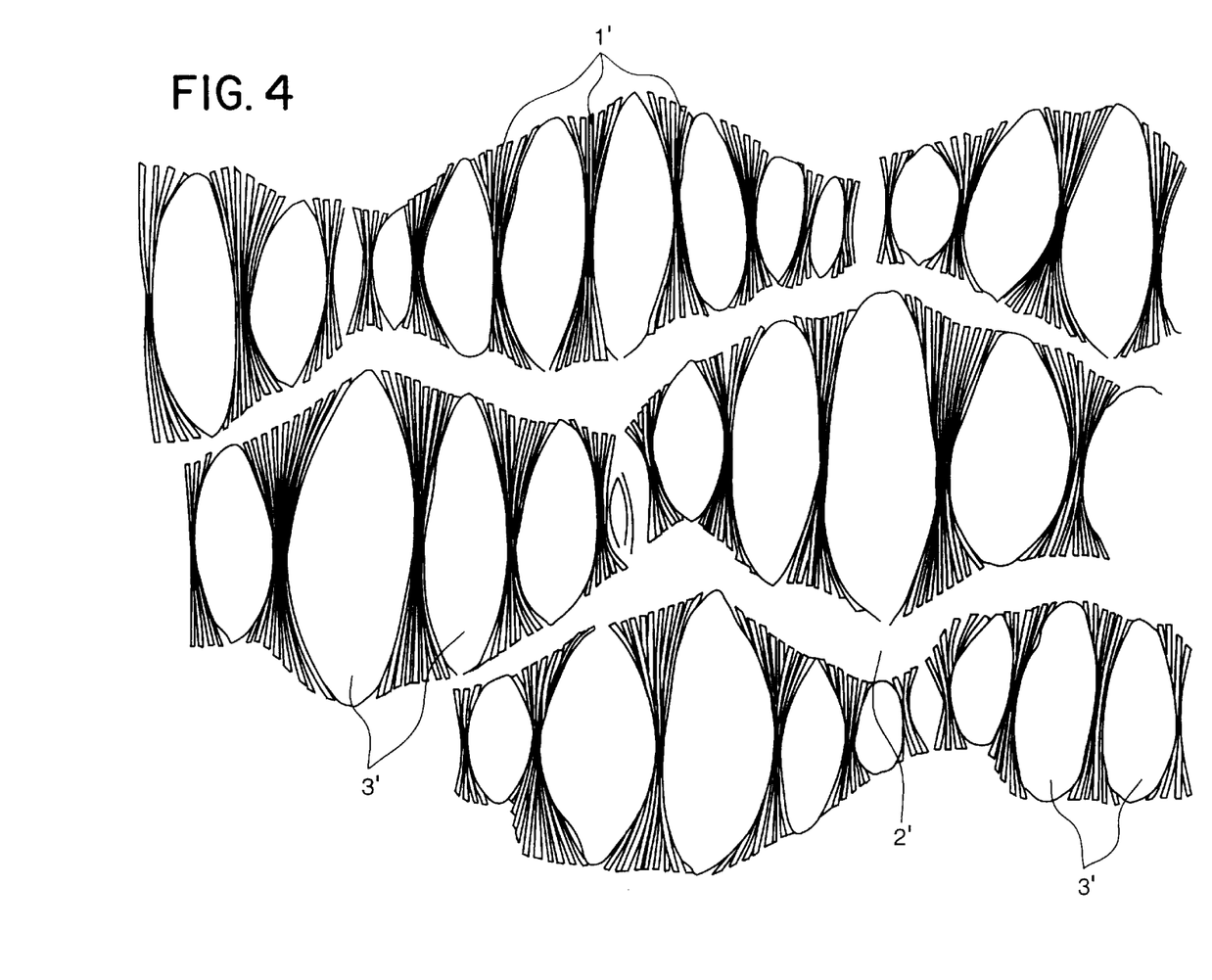
FIG. 4 shows a schematic diagram showing a hydrophilic microporous membrane of the present invention obtained after a hydrophilizing treatment of a precursor of a microporous polyolefin membrane that is subjected to an opening treatment by a melt stretching method. 1' refers to a microfibril bundle, 2' refers to a stacked lamella, and 3' refers to an elliptic micropore.

Japanese Patent Publication Hei.3-70539 also discloses a hydrophilic microporous polyethylene membrane, as shown in FIG. 4, covered by ethylene-vinyl alcohol copolymer. This membrane has a permeability of 1.1 to 20.2 $l/m^2 \cdot hr \cdot mmHg$. However, this membrane has a 3 dimensionally meshed structure wherein overall micropores are uniform. Therefore, membranes having a higher separation capability does not necessarily have a sufficient permeability. For example, a membrane having a maximum pore diameter of 0.15 $\mu$m obtained by the Bubble-Point method has a low permeability of 1.1 $l/m^2 \cdot hr \cdot mmHg$, and in the range of high separation capability, a sufficient permeability can not necessarily be obtained.

Japanese Patent Publication Sho.62-44046, and Japanese Patent Laid-Open Publication Sho.62-269706 disclose an invention of composite hollow fiber membrane obtained by joining different layers having microporous structures. However, the air permeability of the membranes obtained by these inventions is shown to be 23,000 $l/m^2 \cdot hr \cdot 0.5 \ kg \cdot cm^{-2}$. This value may be sufficient enough when used as a membrane for gas filtration, but the water permeability of these films are expected to be extremely low, and therefore, these films are not suitable for a water treatment.

SUMMARY OF THE INVENTION

To increase the water permeability of these microporous membranes, it is necessary to decrease the thickness of a porous membrane. However, the mechanical strength of the microporous membrane decreases when the membrane thickness is decreased. On the other hand, when the membrane thickness is increased, the mechanical strength of the membrane increases, but, in turn, the water permeability decreases. Therefore, the present inventors have discovered that a composite microporous membrane having a small decrease of membrane permeability of the membrane irrespective to an increase of the membrane thickness can be provided to meet both requirements by providing a composite micorporous membrane wherein a porous membrane being capable of separating particles of desired diameter is joined by a microporous membrane having micropores having larger diameters than the desired diameters by a predetermined ratio. In another words, the present inventors have developed the present invention through intensive effort of study to obtain a microporous polyolefin membrane having a high separation capability (the diameter of particle that can be separated is no less than 0.050 $\mu$m) and a high flux value (the speed of water permeation is not less than 0.5 $l/m^2 \cdot hr \cdot mmHg$, preferably not less than 0.8 $l/m^2 \cdot hr \cdot mmHg$, and more preferably not less than 1 $l/m^2 \cdot hr \cdot mmHg$).

The gist of the present invention is a composite microporous polyolefin membrane comprising microporous layer, b-layer, providing a function of reinforcing the mechanical strength of the membrane, the b-layer being bonded to at least one surface of microporous layer, a-layer, providing a separation function, wherein each a-layer and b-layer is composed of a stacked body of micropores comprising microfibril bundles oriented in the direction of stretching and knotted portion of stacked lamella being connected at both ends of the microfibril bundles, and wherein these micropores are forming interconnected channels that communicate between one surface and the other surface of the composite microporous membrane, and wherein the microfibril bundles and the knotted portions of the stacked lamella which compose the micropores of said microporous membrane are coated by 3 to 30% by weight of hydrophilic polymer, and also wherein the mean distance Da between each microfibril bundle in the micropores existing in a-layer and the average distance Db between each microfibril bundle in the micropores existing in b-layer are such that the ratio of these two values is in the range of $1.3 \leq Db/Da \leq 15$.

DETAILED DESCRIPTION OF THE INVENTION

The microporous membrane of the present invention is in the range of 5 to 500 μm in thickness, and has a multilayered structure wherein the microporous layer, b-layer, providing a reinforcing function, is stacked on at least one surface of the microporous layer, a-layer, providing a separation function. The structure of the present invention may have a two-layered structure wherein b-layer is stacked on one surface of a-layer, or may have a three-layered structure wherein b-layer is stacked on both surfaces of a-layer.

Both layers of a-layer and b-layer have micropores, wherein said micropores are oriented in the direction of stretching, and furthermore, said micropores are mutually interconnected either within each layer of a-layer and b-layer, or inbetween both layers of a-layer and b-layer, thereby forming stacked and interconnected micropores communicating one surface of said composite microporous membrane with the other surface thereof.

The micropore formed in a-layer comprises microfibril bundles oriented in the direction of membrane stretching and the knotted portions of stacked lamella oriented in the direction perpendicular to the direction of membrane stretching, wherein the opening between the microfibril bundles and said knotted portions is forming elliptic micropores.

As for the size of micropores in a-layer, it is preferable to have the mean distance Da between each microfibril bundle in the range between 0.1 and 0.8 μm, and more preferably it is in the range between 0.3 and 0.5 μm. A good water permeability is obtained with the microporous membrane of the present invention having the mean distance Da of 0.3 μm between each fibril bundles, and a good capability of blocking fine particles having diameters not more than 0.5 μm, which indicates a membrane of a high separation is obtained.

It is preferable to have the thickness of a-layer in the range between 0.5 and 20 μm, and it is more preferable to have the thickness in the range between 3 and 12 μm. When the thickness of a-layer becomes smaller than 0.5 μm, pin-holes tend to occur in a-layer. On the other hand, when the thickness of a-layer becomes larger than 20 μm, the water permeability of the composite microporous membrane tends to become smaller. Furthermore, it is preferable to have the membrane thickness of a-layer not larger than 1/3 of the total membrane thickness, and when a composite microporous membrane having a larger membrane thickness is used the water permeability decreases drastically.

The microporous b-layer provides a reinforcing function by supporting the microporous a-layer which provides a separation function of the composite membrane. The b-layer, similarly to the a-layer, has a multi-layered structure of micropores oriented in the direction of membrane stretching, wherein said micropores are composed of microfibril bundles and the knotted portions of stacked lamella. As for the size of the micropores of b-layer, it is preferable to have the mean distance Da between each microfibril bundles in the range between 0.2 and 1 μm, and it is more preferable to have the mean distance in the range between 0.4 and 0.5 μm. When a composite microporous membrane having b-layer comprising micropores having Db less than 0.2 μm is used, the rate of water permeation tends to decrease. On the other hand, when Db is more than 1 μm, the mechanical strength of the composite microporous membrane having b-layer having micropores tends to decrease.

Furthermore, the mean distance Lb between each knotted portion of stacked lamella of b-layer is preferably in the range between 0.4 and 4.0 μm, and more preferably in the range between 0.7 and 2.0 μm. In a case of a composite microporous membrane having b-layer comprising micropores having Lb of less than 0.4 μm, the rate of water permeation tends to decrease. On the other hand, in a case when Lb is more than 4.0 μm, the mechanical strength of the composite microporous membrane tends to decrease.

In the present invention, it is necessary to have the ratio of Db and Da to be in the range of $1.3 \leq Db/Da \leq 15$. In the case of a composite microporous membrane having the ratio of Db/Da less than 1.3, it tends to be difficult to obtain a membrane with a high water permeability and a high separation intended to be achieved in the present invention. Furthermore, it tends to be difficult to manufacture a stable composite microporous membrane having the ratio of Db/Da larger than 15.

In the composite microporous membrane of the present invention, the maximum pore diameter obtained by the Bubble-Point method is preferably in the range of 0.05 to 1.0 μm. In the case of a composite microporous membrane having a maximum pore diameter less than 0.05 μm, the rate of water permeation tends to decrease, and when the maximum pore diameter becomes larger than 1.0 μm, the mechanical strength decreases.

An advantage of the composite microporous membrane of the present invention is a characteristic of a high flux and a high separation because the microporous membrane has the above-mentioned composite structure. The criteria for being high flux is to have the water permeability being not less than 0.5 $l/m^2 \cdot hr \cdot mmHg$, and more preferably not less than 1 $l/m^2 \cdot hr \cdot mmHg$ when the diameter of separated particles by the membrane of the present invention is, for example, the diameter of possible blocking that is not less than 0.050 μm. When the membrane is used in the range where the diameter of possible separation of particles by the composite microporous membrane is not less than 0.100 μm, the water permeability is preferably not less than 2 $l/m^2 \cdot hr \cdot mmHg$, and more preferably not less than 3 $l/m^2 \cdot hr \cdot mmHg$, and further preferably 5 $l/m^2 \cdot hr \cdot mmHg$. Furthermore, when the membrane is used in the range wherein the diameter of possible separation of particles by the composite microporous membrane is not less than 0.170 μm, the water permeability is preferably not less than 5 $l/m^2 \cdot hr \cdot mmHg$.

Polymers such as polyethylene, polypropylen, poly-3-methylbutene, poly-4-methylpentene, polyvinylidene fluoride alone or mixtures of copolymers thereof can be used.

When the microporous membrane of the present invention is used in medical applications, materials having low content of soluble component in the membrane material and having blood compatibility is preferable. Furthermore, when the microporous membrane of the present invention is used in industrial applications, it is preferable to select materials so that it is possible to produce a membrane having good durability and mechanical property.

The MI (melt index) value of polyolefin used in the present invention and obtained by a measurement according to ASTM D-1238 is in the range between 0.1 and 50, and is preferably in the range between 0.3 and 15. Polyolefin having MI value less than 0.1 is difficult to be formed and a desired microporous membrane can not be obtained because its viscosity when melted is too high. On the other hand, with polyolefin having MI value of more than 50, it is difficult to obtain a reliable forming because of its low viscosity when melted.

Although the density of a polyolefin used in the embodiment of the present invention differs depending on each material to be used, it is preferable to use a polyethylene having a density not less than 0.95 g/cm$^3$, and it is preferable to use polpropylene having a density not less than 0.91 g/cm$^3$.

During a process of producing the microporous membrane of the present invention, when the MI value, MIa, of polyolefin used for making a-layer and the MI value, MIb, of polyolefin used for making b-layer are selected in such a way as to have a condition of MIa<MIb, the composite microporous membrane of the present invention can be obtained even in a case wherein the density, $\rho$a, of polyolefin used for the formation of a-layer and the density, $\rho$b, of polyolefin used for the formation of b-layer are roughly equal.

On the other hand, when each polyolefin is selected in such a way as to have a condition of $\rho$a<$\rho$b, the composite microporous membrane of the present invention can be obtained even when MIa and MIb are equal.

When each polyolefin is preferably selected to satisfy both conditions of MIa<MIb and $\rho$a<$\rho$b, the composite microporous membrane of the present invention can be produced efficiently.

The mean distance between each microfibril bundle of the micropores in the present invention was measured by the following method.

Figure 5:
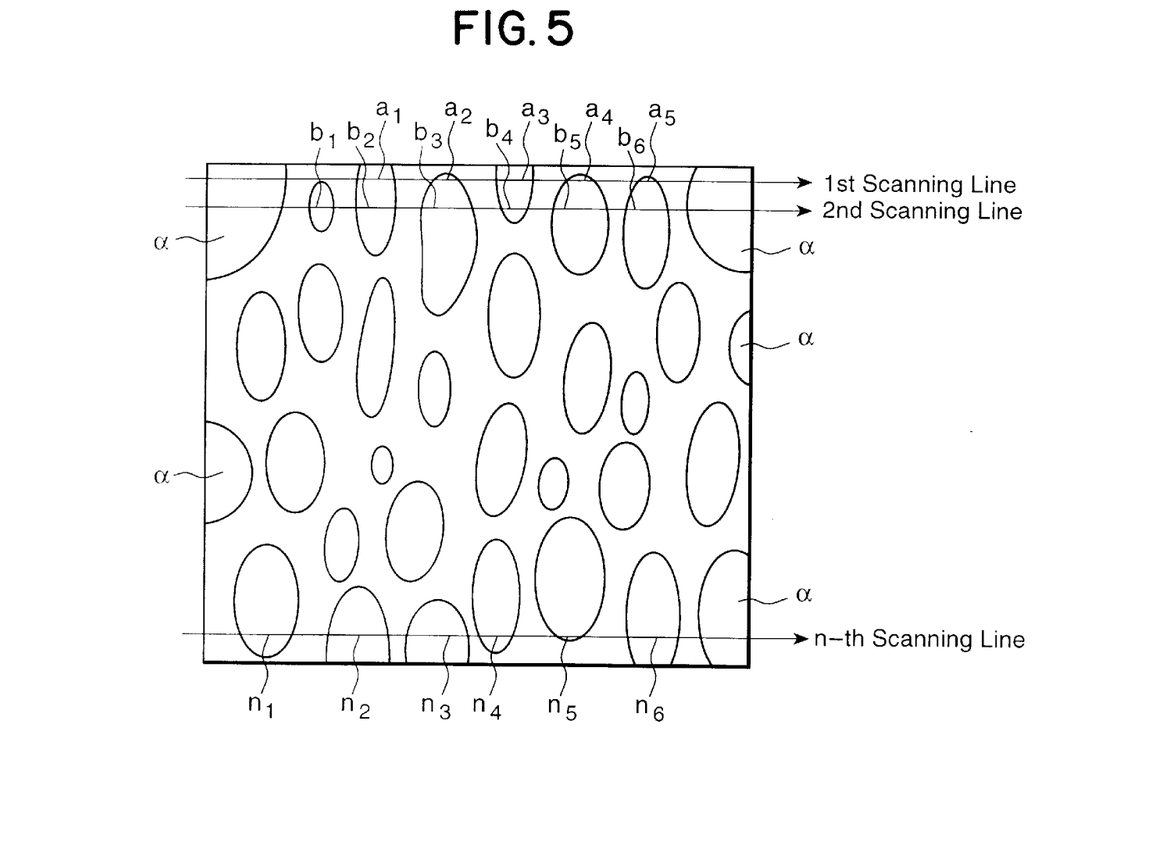
FIG. 5 is a schematic diagram explaining a measuring method of a mean distance between microfibril bundles in a micropore.

Initially insert a portion of 6 cm square from a 6500 times magnified picture of a sample being cut in a very thin section in the direction of membrane stretching of the microporous membrane under a transmission electron microscope into the picture of CRT of an image processor (FIG. 5 shows this picture). Scanning lines from 1st to nth line are drawn at a spacing of 0.05 2 $\mu$m extending in the direction perpendicular to the direction of membrane stretching, and thereby all the way to the bottom portion of the inserted picture is covered. Exclude the portion indicated by $\alpha$ where the mean distance between each microfibril bundle can not be measured. Each distance of the section of the first line passing through the pore portion, for example, the summation of $a_1$ to $a_5$ is obtained. In the same manner, the summation of $b_1$ to $b_6$, for example, of the second line is obtained. This process is repeated up to nth line to obtain, for example, the summation of $n_1$ to $n_6$. The value of total sum (total distance) is obtained from these values. The total number of micropores (total number) intersecting each line (in this example, 5 along the first line, 6 along the second line, 6 along the nth line) is obtained to calculate the mean distance Da, Db by dividing the total distance by the total number.

The method to obtain the composite microporous membrane of the present invention comprises, initially making a precursor of a composite microporous membrane which is an intermediary, followed by subjecting to a coating treatment by using hydrophilic copolymer. The precursor may be obtained by forming a membrane by using a composite spinning method followed by selecting a polyolefin that meets the above requirements.

When the composite microporous precursor is in a shape of a hollow fiber membrane, a nozzle having more than two tubular nozzles provided in a cocentrical manner is preferably used.

The spinning temperature should not be less than the melting temperature of polyolefin (preferably 10° to 100° C. higher than the melting temperature). The extruded polymer is drawn at a reel speed of 0.1 to 3 m/sec. in an atmosphere at a temperature of 10° to 40° C. The muli-layered material obtained therefrom is subjected under an as-is condition to a heat treatment to form stacked lamella or to a heat treatment at a temperature (preferably at a temperature 5° to 50° C. lower than the melting temperature) not lower than the melting temperature of polyolefin, followed by being subjected to stretching to obtain openings in the multi-layered body. The stretching is preferably done by a cold stretching followed subsequently by a hot stretching. The cold stretching is a process wherein microcracks are induced between stacked lamella by causing a structural failure of the multi-layered body at a relatively low temperature. This cold stretching is preferably carried out in a temperature range between 0° C. and a temperature 50° C. lower than the melting point of the polyer. When polyolefin and polyethylene are used, this temperature for cold stretching is in the range between 0° and 80° C., and preferably in the range between 10° and 50° C. Furthermore, the cold stretching magnification is preferably from 5 to 100%. When this magnification is not more than 5%, the microcracks are not fully developed and thus intended pore diameters are not easily obtained. On the other hand, when this magnification is not less than 100%, too many microcracks are developed and thus intended large pore diameters are not easily obtained in the supporting layer (b layer).

The subsequent hot stretching is a process wherein the membrane is made into a microporous membrane having micropores of slit-like shape by enlarging microcracks developed in the multi layered body, followed by forming microfibrils between stacked lamella. The hot stretching temperature should not be higher than the melting temperature of polyolefin, and the hot stretching should be carried out at a temperature as high as possible. Furthermore, the hot stretching magnification may be appropriately selected for each intended pore diameter, and it may be in the range between 50 and 2000%, and it may preferably be in the range between 100 and 1000% to have a reliable production process.

The membrane thus obtained is further subjected to a hot setting, wherein the membrane is kept under a constant length or under a slightly creeped condition, to have a dimensional stability of the precursor of microporous membrane. The temperature of the hot setting should not be less than the stretching temperature, and should preferably be not more than the melting temperature.

The precursor of the muli-layered composite membrane thus obtained is further subjected to a process to render a permanent hydrophilic property. The hydrophilic copolymer used in the present invention may be composed of a copolymer having not less than 20% by mole of ethylene and not less than 10% by mole of hydrophilic monomer. Any type of copolymer selected from copolymers such as randomly oriented copolymer, blocked-copolymer and grafted-copolymer may be used.

When the content of ethylene in the copolymer is less than 20% by mole, it is not preferable because the copolymer does not provide a sufficient affinity to the precursor, and whereby precursor can not be coated by the hydrophilic copolymer at the ratio of 3 to 30% by weight for 100% by weight of precursor by immersing the precursor in a solution of hydrophilic copolymer.

As for the hydrophilic monomer used in the process of copolymerization of the hydrophilic copolymer used in the present invention, vinyl compounds such as vinyl alcohol, (meta)acrylic acid and its salts, hydroxylethyl(meta) acrylate, polyethylenegrycol(meta)acrylic ester, vinylpyrrolidone and acrylamide may be used. Any vinyl compounds may be used as long as more than one kind of hydrophilic monomer is contained, and vinyl alcohol may be preferably used as the monomer. The hydrophilic copolymer used in the present invention may contain a third component other than either ethylene or hydrophilic monomer, wherein said third component may be acetic vinyl, (meta)acrylic ester, vinyl alcoholic fatty ester, formal or butylar derivative of vinyl alcohol and the like.

The amount of coating of the hydrophilyc copolymer on the precursor of microporous membrane should be in the range between 3 to 30% by weight in terms of precursor's weight. When said amount is less than 3% by weight, a sufficient hydrophilic property of the microporous membrane can not be obtained, and thereby water is insufficiently permeated into the microporous membrane. On the other hand, when said amount exceeds 30% by weight, the micropores in the membrane tend to be clogged by the copolymer, whereby the permeability tends to be reduced.

The solvent for the copolymer used in the present invention is preferably a water soluble organic solvent, comprising alcohols, such as methanol, ethanol, n-propanol, isopropylalchol, or dimethylsulphoxide, dimethylformamide and the like. These solvents may be used alone, but they are more preferably used in a mixture with water because the mixture provides a higher solubility to a hydrophilic copolymer. A mixed solvent comprising water and alcohols having a boiling point less than 100° C., such as methanol, ethanol, and isopropylalchol may be most preferably used thereby providing ease of making an environment having solvent vapor used in the process of drying the microporous membrane covered by the hydrophilic copolymer, in another words, a low solvent vapor pressure, and consequently thereby providing low toxicity to human beings.

The mixing ratio of the water soluble solvent to water may be selected at any ratio as long as the permeability into the precursor is not impeded and the solubility of the copolymer is not decreased. It may depend on the type of copolymer used, and the ratio of ethanol to water is preferably in the range between 90/10 and 30/70 (% by volume) when ethanol is used as an organic solvent.

The concentration of hydrophilic copolymer should be roughly in the range between 0.1 and 10% by weight, and it should preferably be in the range of 0.5 to 5% by weight. It is difficult to coat evenly with a hydrophilic copolymer when the precursor is treated by a solution having a concentration of less than 0.1% by weight. On the other hand, when the concentration is more than 10% by weight, the viscosity of the solution becomes too high, whereby micropores of the multi-layered membrane are clogged by the copolymer when the precursor is treated using said solution. As for the method of immersing the precursor in the hydrophilic copolymer solution, either method of immersing the precursor more than twice in a copolymer solution with the same concentration of copolymer or of immersing the precursor more than twice in a copolymer solution with different concentration of copolymer.

It is preferable to have a higher temperature of the hydrophilic copolymer solution used in the immersion treatment, because a lower viscosity is obtained at a higher temperature, whereby the permeability of the solution into the precursor is increased, but it should be preferably below the boiling point of the solution from the safety point of view.

The duration of the immersion treatment depends on such factors as the membrane thickness, the diameter of micropores and porosity of the precursor, and it is preferably in the range between a few seconds and a few minutes.

After being immersed in the hydrophilic copolymer solution, and before being subjected to a drying treatment, the precursor needs to be subjected to a setting process after being left for at least 30 seconds in an atmosphere having not less than 3% by volume of the organic solvent vapor, and being set at a temperature between the room temperature and a temperature below the boiling point of said solvent.

The objective of this treatment is to eliminate any clogging of micropores by a coating membrane being formed on the surface of microfibrils and knotted portions of the stacked lamella, both of these are composing the precursor. A further objective of this treatment is to form elliptic micropores by bundling microfibrils, thereby enlarging the slit-like micropores to increase the water permeability and to increase the affinity to the water to be treated.

To prevent any formation of film coating on the surface of the precursor of hydrophilic copolymer during the setting process of the present invention, it is necessary to protect the surface of a precursor from a rapid drying. To achieve this objective, it is required to reduce the evaporation speed of the copolymer solution at the surface of precursor, and it is also required to keep the surface of precursor wet with the solvent. From this point of view, it is necessary to maintain the atmosphere of a setting process in such condition as to provide an atmosphere having a vapor of not less than 3% by volume of a water miscible solvent.

It is preferable to keep the evaporation speed of the solvent from the precursor during said setting process as low as possible, and it is preferable to keep the atmosphere of the setting process close to an atmosphere having a saturated vapor concentration of the solvent. Furthermore, to reduce the vaporization speed of the solvent at the surface of precursor, it is preferable to keep the setting temperature low. However, when the temperature is too low, an unfavorable phenomenon may occur wherein the solvent removal during the setting process may not proceed. Therefore, the temperature of said atmosphere should preferably be kept at not less than the room temperature and not more than the boiling point of the water miscible solvent.

The precursor after the immersion operation may be raised from the immersion bath into said atmosphere at a preferable angle ranging from 45° to 90°. By this raising process, some of the copolymer solution adhered to the precursor drips off due to its own weight. The amount of dripping depends on such factors as raising speed of the precursor form the immersion bath, the viscosity of immersion solution and the raising speed of the precursor from the surface of immersion bath. As a supplementary method to increase the effect of dripping during the setting process, guides or slits and the like may be employed to wipe off the solution from the surface of precursor.

At least a duration of 30 seconds is required for this setting process. During this process, a condensation of copolymer solution due to the evaporation of solvent from the precursor and a homogenizing of the membrane through migration at the surface of stacked lamella and microfibrils may be effectuated. Especially when precursor is subjected to a continuous treatment using hydrophilic solution, it is required to keep the duration of this setting process for not less than 30 seconds. The duration of setting for less than 30 seconds results in insufficient condensation of the solvent by evaporation, whereby a condition may occur wherein the precursor is subjected to drying with an excess amount of solution being left on the precursor, which may cause the clogging of micropores by hydrophilic copolymer, and while the homogeneous setting of copolymer in the membrane structure being insufficient, thereby causing it difficult to obtain microporous membrane with a high water permeability and a high separation capability.

Furthermore, the amount of solvent evaporation from the precursor, when the duration of setting is for 30 seconds, is preferably from roughly 15 to 30% of the used hydrophilic copolymer solution.

As for a method of controlling the amount of solvent vaporization from the precursor during the setting process, such method as controlling the temperature of atmosphere for setting and venting air or insert gas into said atmosphere.

Drying of the precursor after being subjected to a setting process may be effectuated by using any of known drying methods such as vacuum drying and hot air drying. The drying temperature may be at any temperature as long as the composite microporous membrane may not be deformed by the heat. For example, a composite microporous polyethylene membrane may be preferably dried at a temperature not higher than 120° C., and it may be most preferably dried at a temperature from 40° to 70° C.

From the point of filtration capacity, the amount of adhesion of hydrophilic copolymer to the precursor of composite microporous membrane is roughly from 1 to 30% by weight, more preferably from 3 to 15% by weight of the weight of precursor of composite microporous membrane working as a substrata.

Figure 3:
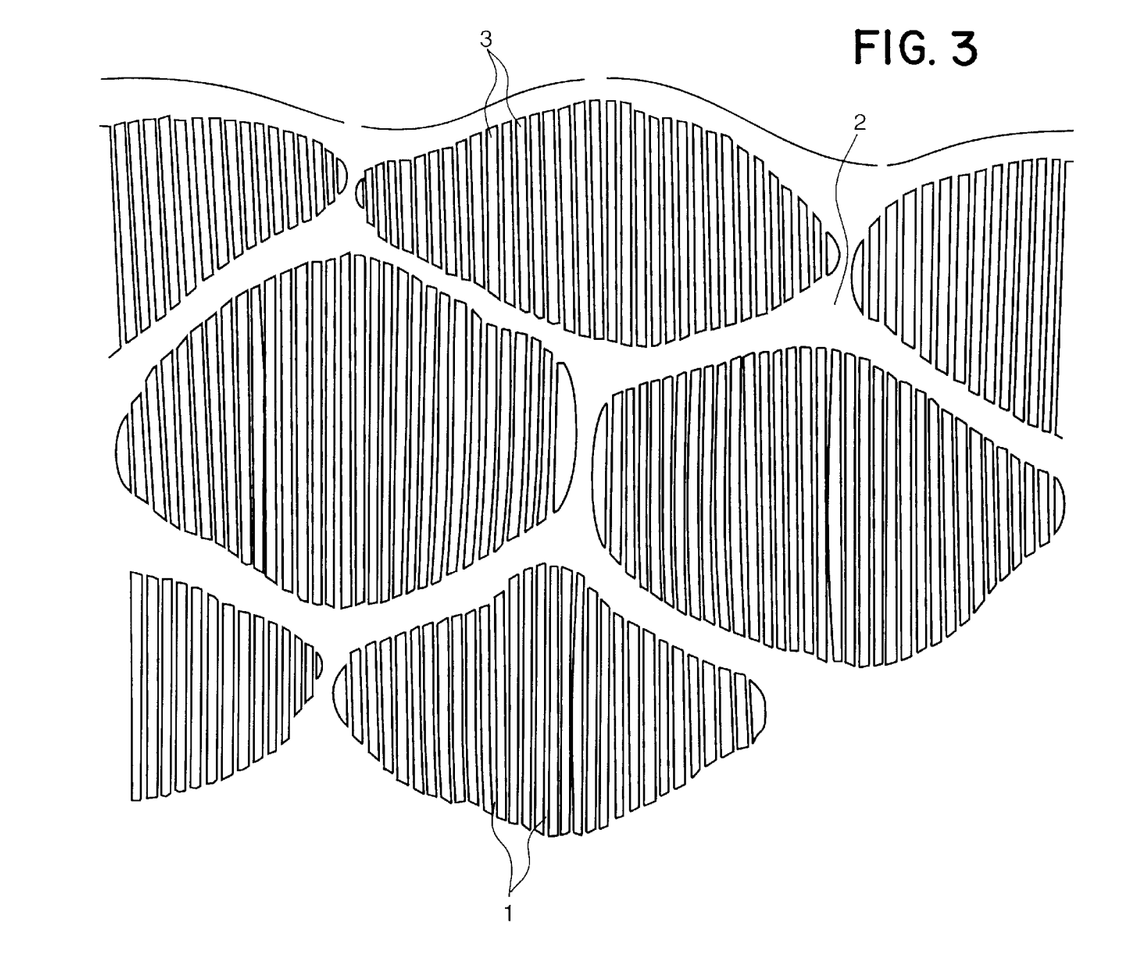
FIG. 3 shows a schematic diagram showing microporous polyolefin membrane obtained after an opening of pores by a melt stretching method. The numeral 1 refers to a microfibril, 2 refers to a stacked lamella, and 3 refers to a slit-like micropore.

The microfibrils (refer to FIG. 3-1) in the precursor of microporous membrane are bundled together by this coating treatment by hydrophilic copolymer, thereby forming microfibril bundles (refer to FIG. 4-1') and the slit-like micropores (refer to FIG. 3—3) transforming into elliptic micropores (refer to FIG. 4-3').

The present invention is further explained in detail in the following examples. The various measurements and evaluations used in the present examples were carried out according to the following methods.

1. Gas detector (a commercial name of "Gastech Gas Detector") was used to measure the concentration of ethanol in the atmosphere.
2. The coated amount of hydrophilic copolymer was calculated by using the following equation.

Dried Membrane Weight After Hydrophilization Treatment–Dried Porous Membrane Weight of Precursor/Dried Porous Membrane Weight of Precursor×100

3. The water permeability was measured by using a miniature sized module having an effective surface area of from 70 to 90 cm², and thereby measuring the water permeability by permeating ion exchanged water at a pressure difference of 1 kg/cm².
4. The diameter of trapped particles by using standard latex particles was measured by the following method: Air trapped in a membrane was replaced by water based solution containing 0.1% by weight of surfactant (polyethylenegrycol-p-isooctylphenylether) by using a module comprising a hollow fiber membrane with a surface area of roughly 50 cm². Then, polystylene latex particles were filtered, followed by measuring the concentration of the latex particles in the filtrate at the wave length of 320 nm by using a spectrophotometer from Hitachi (U-3400), thereby the rate of trap was evaluated.
5. Bubble Point Value (herein after referred to as "B.P.") was obtained by the following procedure. A hollow fiber membrane module having a surface area of roughly 50 cm² was immersed in ethanol having a concentration of not less than 50%, thereby completely immersing the hollow fiber membrane. The ethanol was sucked up in the amount of not less than 100 ml from the inside of the hollow fiber membrane so that the inside of the pores in the hollow fiber membrane become sufficiently wet by ethanol, followed by increasing the air pressure by each step of 0.1 kg/cm² at each time interval of 10 seconds by injecting nitrogen gas inside of the hollow fiber membrane while the membrane being immersed in the ethanol. Bubble Point Value was obtained as the pressure of nitrogen gas when the bubbling occurs roughly over the entire surface of the hollow fiber membrane, wherein the distance between each bubbling point is not more than 1 mm. The mean pore diameter by using this Bubble Point Value was calculated by the following equation.

$$P = 2\sigma \cos\theta / r$$

where:
P: pressure (Bubble Point value)
σ: surface tension of ethanol
θ: contact angle between ethanol and membrane
r: mean radios of micropores 6. The porosity of the membrane was measured by using a mercury porosimeter model 221 from CarloElva.
7. The mean distance between each microfibril bundle in micropores was measured by the above-mentioned method.
8. The mean distance La or Lb between each knotted portion formed by stacked lamella and microfibril bundles in the micropores of a-layer and b-layer, respectively, was calculated by using the same method (however, the scanned direction was along the membrane stretching direction and the pitch was 0.0045 μm) used for the measurement of the mean distance between each microfibril bundles in the micropores.

EXAMPLE 1

64% by weight of a high density polyethylene having a melt index (MI) of 5.5 and a density of 0.968 g/cm³ (Hizex 2200 J, from Mitsui Oil & Chemical Co., Ltd.), 21% by weight of a high density polyethylene having a MI value of 0.35 and a density of 0.968 g/cm³ (BU004N, from Mitsubishi Chemicals Co., Ltd) and 15% by weight of a low density polyethylene having a MI value of 8.0 and a density of 0.920 g/cm³ (Ultzex 20200 J, from Mitsui Oil & Chemical Co., Ltd.) were hot mixed by using a twin screw extruder at a temperature of 180° C. to obtain a blended polymer having a MI value of 5.2 and a density of 0.961 g/cm³.

This blended polymer was used as a polymer to form a-layer, and the above-mentioned high density polyethylene having a MI value of 5.5 and a density of 0.968 g/cm³ was used as a polymer to form b-layer, whereby these polymers were melt-spinned by using a nozzle for manufacturing hollow fibers at a temperature of 158° C. and at a reel speed of 80 m/min, wherein the nozzle has two tubular nozzles provided in a concentric manner. In this case, said blended polymer and said high density polyethylene were extruded from the outer nozzle and the inner nozzle, respectively, under a condition where these polymers were extruded at an extrusion ratio of 1/5, at a line speed of 3.01 cm/min., and at a draft ratio of 2560. Furthermore, the composite hollow fiber before stretching was obtained by reeling up the extruded fiber from the nozzle while a cooling air having a temperature of 20° C. and air speed of 3.0 m/sec. being blown uniformly around the fiber.

The hollow fiber thus obtained before stretching was subjected to an annealing treatment for 12 hours while being set at a constant length in an atmosphere kept at 115° C. A precursor of composite microporous hollow fiber membrane was obtained by cold-stretching the annealed fiber by 80% while subjecting the fiber to a roller kept at 30° C., and subsequently hot-stretching the cold-stretched fiber so that the total amount of stretching becomes 400% in a roller in an oven kept at 108° C., and further subjecting to a hot setting thereby relieving the stretching by 25% of the total amount of stretching in a hot chamber kept at 115° C.

Then, 1.8% by weight of ethylene-vinyl alcohol copolymer having an ethylene content of 32% by mole (Soanol DC3203, from Japan Synthetic Chemicals Co., Ltd.) was dissolved in a solution having a ratio of ethanol/water=40/60% by volume, thereby a solution having a hydrophilic copolymer was prepared. The above-mentioned precursor was immersed in the solution thus obtained for a duration of 150 seconds, followed by being raised, then a part of the hydrophilyzing solution being extensively adhered on the surface of said composite hollow fiber was ringed off by a guide. Furthermore, the precursor was raised at a rising angle of 90° in an atmosphere having an ethanol vapor concentration of 40% by volume and a temperature of 60° C., thereby uniformly coating the inner surface of micropores of the precursor by the hydrophilyzing solution while the precursor being left still for a duration of 360 seconds, followed by drying the solution by a hot air having a temperature of 60° C. The coating rate of ethylene-vinyl alcohol copolymer on the hydrophlilyzed hollow fiber membrane thus obtained was 8.7% by weight.

Figure 1:
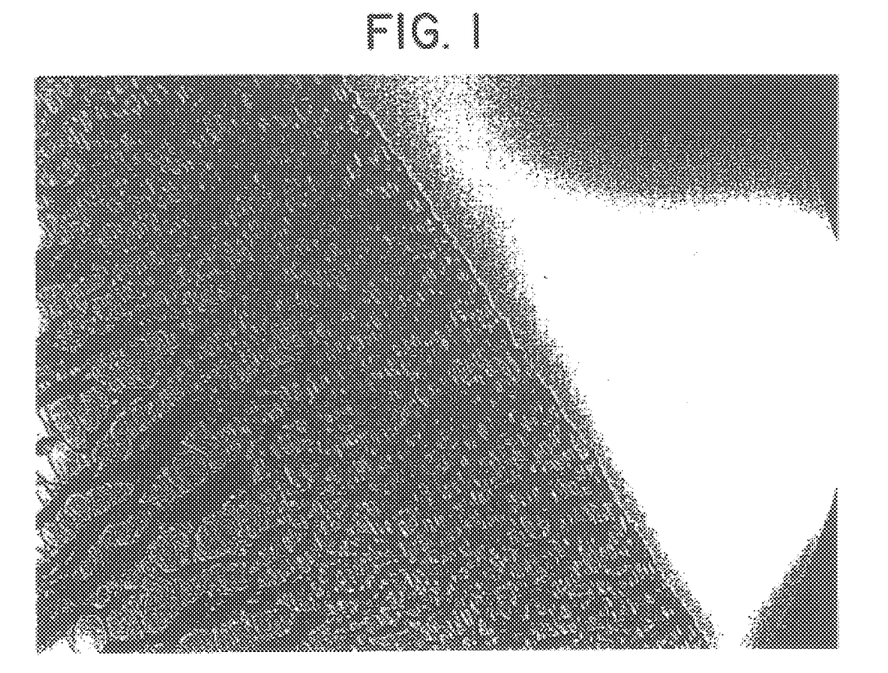
FIG. 1 shows a cross sectional view of the composite microporous membrane obtained in example 1 under a transmission microscope. (magnification: 2900)

When the composite microporous hollow fiber membrane thus obtained was examined under a transmission electron microscope, both outer and inner surfaces, and also the surface of micropores of said composite microporos hollow fiber membrane were uniformly coated by a thin film of ethylene-vinyl alcohol copolymer. The mean distance between each fibril bundle of micropores in the inner layer (b-layer) was 0.33 µm, and that of micropores in the outer layer (a-layer) was 0.17 µm. The ratio of Db/Da of the same membrane was 1.94, and the thickness of the outer layer providing the separation function was 10 µm. FIG. 1 shows a photo of the membrane thus obtained under a transmission electron microscope, and Table 1 shows the membrane characteristics of the membrane thus obtained.

EXAMPLE 2

67% by weight of a high density polyethylene having a density of 0.968 g/cm³ and a MI value of 0.35 (BU004F, from Mitsubishi Chemicals Co., Ltd.) and 33% by weight of a high density polyethylene having a density of 0.962 g/cm³ and a MI value of 0.35 (BT004 from Mitsubishi Chemicals Co., Ltd.) were blended while being melted by a twin blade extruder at a temperature of 180° C., thereby a blended polymer having a density of 0.966 g/cm³ and a MI value of 0.35 was obtained.

Then, the blended polymer was melt spinned from a nozzle for manufacturing hollow fibers having two tubular nozzles provided in a concentric manner at a extrusion temperature of 180° C. and at a reel speed of 35 m/min. to provide a polymer for a-layer and while above-mentioned high density polyethylene having a density of 0.968 g/cm³ and a MI calue of 0.35 was extruded to prove a polymer for b-layer. The blended polymer was extruded form the outer nozzle and the above-mentioned high density polyethylene was extruded, respectively, at a extrusion ratio of 1/5, at a total extrusion volume of 7.5 cc/min.nozzle, at an extrusion line speed of 57 cm/min., and at a draft ratio of 75. A composite hollow fiber before stretching was obtained by reeling up the fiber by uniformly subjecting the surface of the fiber being extruded from the nozzle to a cooling air having a temperature of 20° C. and an air speed of 0.5 m/sec.

The hollow fiber thus obtained was subjected to a heat treatment for a duration of 16 hours in a air having a temperature of 125° C. while the hollow fiber remaining on a bobbin. The annealed fiber was further subjected to a cold stretching of 16% in rollers kept at 30° C., followed by being subjected to hot stretching in rollers in a oven kept at 119° C. to have the total stretching of 400%. The annealed fiber was further subjected to a heat setting at a constant length in a oven kept at 123° C. to have a tow layered precursor of composite microporous hollow fiber membrane.

Then, 2.0% by wight of ethylene-vinyl alcohol copolymer having an ethylene content of 32% by mole (Soanol DC3203, from Japan Synthetic Chemicals Co., Ltd.) was dissolved in a solution having a ratio of ethanol/water=40/60% by volume, thereby a solution having a hydrophilic copolymer was prepared. The above-mentioned precursor was immersed in the solution thus obtained for a duration of 30 seconds, followed by being raised, then a part of the hydrophilyzing solution being extensively adhered on the surface of said precursor was wringed off by a guide. Subsequently, the precursor was raised at a rising angle of 90° in an atmosphere having an ethanol vapor concentration of 40% by volume and a temperature of 60° C., while uniformly coating the inner surface of micropores of the precursor by the hydrophilyzing solution while the precursor being left still for a duration of 80 seconds, followed by drying the solution by a hot air having a temperature of 70° C. The coating rate of ethylene-vinyl alcohol copolymer on the hydrophlilic hollow fiber membrane thus obtained was 10.5% by weight.

Figure 2:
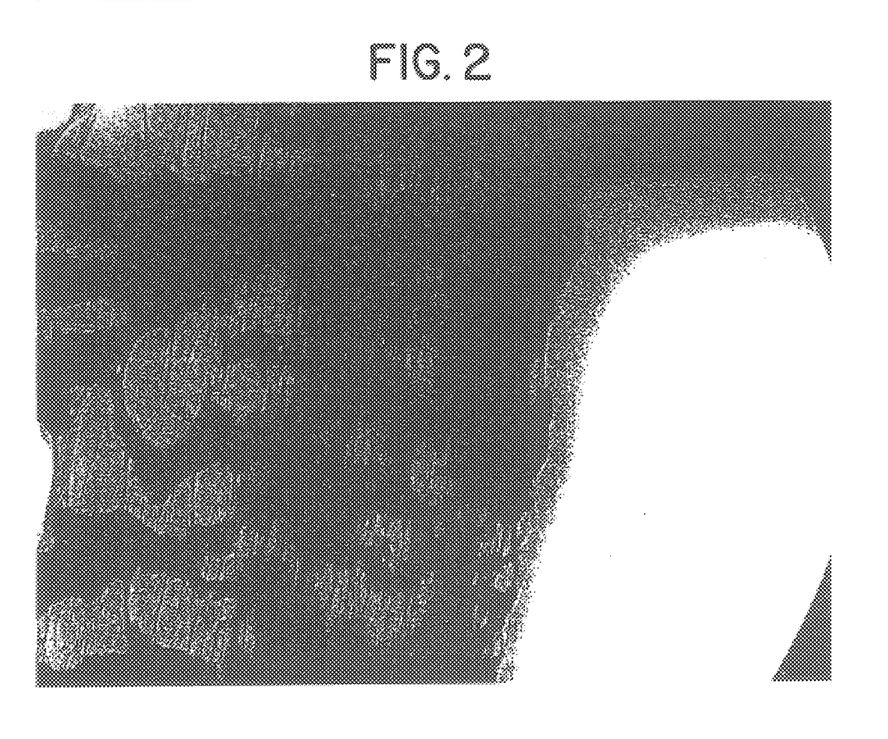
FIG. 2 shows a cross sectional view of the composite microporous membrane obtained in example 2 under a transmission microscope. (magnification: 2900)

When the composite microporous hollow fiber membrane thus obtained was examined under a transmission electron microscope, both outer and inner surfaces, and also the surface of micropores of said composite microporous hollow fiber membrane were uniformly coated by a thin film of ethylene-vinyl alcohol copolymer. The mean distance between each fibril bundle of micropores in the inner layer (b-layer) was 0.54 µm, and that of micropores in the outer layer (a-layer) was 0.35 µm. The ratio of Db/Da of the same membrane was 1.54, and the thickness of the outer layer providing the separation function was 8 µm. FIG. 2 shows a photo of the membrane thus obtained under a transmission electron microscope, and Table 1 shows the membrane characteristics of the membrane thus obtained.

EXAMPLE 3

By using a nozzle for manufacturing hollow fibers having three tubular extrusion nozzles provided in a concentric fashion, a high density polyethylene having a density of 0.965 g/cm³ and a MI value of 0.9 (HY01, from Idemitu Oil & Chemical Co., Ltd.) to be formed into a-layer was extruded from the middle extrusion nozzle at an extrusion rate of 0.375 g/min., and a high density polyethylene having a density of 0.968 g/cm³ and a MI value of 5.5 (Hizex 2200 J) to be formed into b-layer was extruded from both an outermost and an innermost extrusion nozzle at an extrusion rate of 7.5 g/min. The temperature of extrusion was 160° C. and the reel speed was 100 m/min.

The hollow fiber thus obtained before stretching was subjected to a heat treatment for a duration of 12 hours in an air having a temperature of 115° C. while the hollow fiber being left on a bobbin. The heat treated fiber was further subjected to a cold stretching by 80% in rollers kept at a temperature of not more than 30° C., subsequently followed by being subjected to hot stretching in rollers in a oven kept at 107° C. to have a total stretching of 400%. The fiber thus obtained was further subjected to a hot setting thereby relieving the stretching by 225% of the total amount of stretching in an oven kept at 120° C. to have a multi-layered precursor of composite microporous membrane.

16 threads of the precursor of composite microporous membrane thus obtained were bundled. The bundle was then immersed for 30 seconds in a solution having 1.8% by weight (solvent alcohol/water=75/25% by volume) of ethylene-vinyl alcohol copolymer (ethylene content was 44% by mole), followed by wringing off a part of the copolymer solution excessively adhered on a surface of said multilayered composite membrane by a ceramic guide. Furthermore, said multilayered membrane was raised at a rising angle of 90° in an atmosphere having an ethanol vapor concentration of 40% by volume and a temperature of 60° C., while the membrane being left for a duration of 80 seconds, followed by drying the solution by a hot air having a temperature of 55° C., to continuously obtain hydrophilized microporous membrane.

The membrane characteristics of the membrane thus obtained are shown in Table 1.

EXAMPLE 4

A hydrophilic microporous membrane was obtained in a condition similar to that of example 1 except that the hot stretching was carried out at a temperature of 113° C.

The membrane characteristics of the membrane thus obtained are shown in Table 1.

EXAMPLE 5

By using a nozzle for manufacturing hollow fibers having two tubular nozzles provided in a concentric manner, a high density polyethylene having a density of 0.968 g/cm³ and a MI value of 5.5 (Hizex 2200 J, from Mitsui Oil & Chemical Co., Ltd.) to be formed into b-layer was extruded from an outer nozzle and a polyethylene having a density of 0.960 g/cm³ and a MI value of 0.9 (Nissan 2010, from Nissan Chemical Co,. Ltd.) to be formed into a-layer was extruded from an inner nozzle at an extrusion ratio of 10/1, at an extrusion line speed of 5.3 cm/min., at a draft ratio of 3860 and at an extrusion temperature of 170° C. A composite hollow fiber before stretching was further obtained by reeling up the extruded fiber from the nozzle at a reel rate of 205 m/min. while a cooling air having a temperature of 16° C. and an air speed of 1.0 m/sec. being blown uniformly around the fiber.

The hollow fiber thus obtained before stretching was subjected to an annealing treatment for 12 hours while being kept at a constant length in an atmosphere heated to a temperature of 115° C. A precursor of composite microporous hollow fiber membrane was obtained by a cold stretching of the annealed fiber by 80% while subjecting the fiber to a roller kept at 30° C., and followed by a hot stretching of the cold-stretched fiber so that the total amount of stretching becomes 350% and by further subjecting to a hot setting at a constant length for 1 minute in a oven heated to 115° C. A hydrophlyzing treatment was carried out on the precursor under the same conditions used in example 1.

The membrane characteristics of composite microporous hollow fiber membrane are shown in Table 1.

EXAMPLE 6

70% by weight of a high density polyethylene having a MI value of 0.25 and a density of 0.961 g/cm³ (6300, from Toso Co., Ltd.), 30% by weight of a low density polyethylene having a MI value of 0.20 and a density of 0.957 g/cm³ (6200, from Toso Co., Ltd.) were hot mixed by using a twin screw extruder at a temperature of 200° C. to obtain a blended polymer having a MI value of 0.23 and a density of 0.959 g/cm³.

This blended polymer was used as a polymer to form a-layer, and the above-mentioned high density polyethylene having a MI value of 0.25 and a density of 0.961 g/cm³ was used as a polymer to form b-layer, whereby these polymers were melt spinned through a nozzle having two tubular nozzles provided in a concentric manner at a temperature of 200° C. and at a reel speed of 35 m/min.

In this case, said blended polymer and said polyethylene having a density of 0.961 g/cm³ was extruded from an outer nozzle and an inner nozzle, respectively, at a condition where these polymers were extruded at an extrusion ratio of 1/6, at an extrusion line speed of 57 cm/min., and at a draft ratio of 75. Furthermore, a composite hollow fiber before stretching was obtained by reeling up the extruded fiber from the nozzle while a cooling air having a temperature of 30° C. and air speed of 0.5 m/sec. being blown uniformly around the fiber.

The hollow fiber thus obtained before stretching was subjected to an annealing treatment, a stretching treatment, and hydrophilyzing treatment under the same condition as that of example 2, to obtain a composite microporous hollow fiber membrane.

The membrane characteristics of a microporous hollow fiber membrane thus obtained are shown in Table 1.

EXAMPLE 7

By using the same nozzle as that of example 4, polypropylene having a density of 0.91 g/cm³ and a MI value of 1.0 was extruded to provide a polymer forming b-layer as an inner layer, and a high density polyethylene having a density of 0.965 g/cm³ and a MI value of 0.9 was extruded to provide a polymer forming a-layer as an outer layer, at an extrusion rate of 1.1 g/min. for the inner layer and at an extrusion rate of 22.5 g/min. for the outer layer, respectively. An extrusion temperature of 210° C. and a reel speed of 30 m/min. were employed. A precursor of a composite microporous membrane was obtained after a heat treatment and a stretching treatment under the same conditions as those of example 1 except for the aforementioned conditions.

16 threads of the precursor thus obtained were bundled. The bundle was then immersed for 30 seconds in a solution having 1.8% by weight (solvent alcohol/water=75/25% by volume) of ethylene-vinyl alcohol copolymer (ethylene content was 32% by mole) at a temperature of 70° C., followed by wringing off a part of the copolymer solution being excessively adhered on the surface of said multilayered composite membrane by using a ceramic guide. Furthermore, said multilayered membrane was raised at a rising angle of 90° in an atmosphere having an ethanol vapor concentration of 40% by volume and a temperature of 60° C., while the membrane being left for a duration of 360 seconds, followed by drying the solution by a hot air having a temperature of 55° C., to obtain a continuously hydrophylized composite microporous hollow fiber membrane.

The membrane characteristics of the membrane thus obtained are shown in Table 1.

EXAMPLE 8

A composite microporous hollow fiber membrane was obtained under the same conditions as those of example 2 except that a blending ratio of BU004F:BT004=50:50% by weight was employed for the blended polymer. The membrane characteristics of the membrane thus obtained are shown in Table 1.

EXAMPLE 9

A composite microporous hollow fiber membrane was obtained under the same conditions as those of example 2 except that a blending ratio of BU004F:BT004=33:67% by weight was employed for the blended polymer. The membrane characteristics of membrane thus obtained are shown in Table 1.

EXAMPLE 10

A composite microporous hollow fiber membrane was obtained under the same conditions as those of example 2 except that an extrusion ratio of the outer layer and the inner layer of 1/4 during a spinning and the total extrusion rate of 3.0 cc/min.nozzle were employed.

COMPARISON 1

By using a nozzle for manufacturing hollow fibers having a single tubular nozzle, a high density polyethylene having a density of 0.968 g/cm$^3$ and a MI value of 5.5 was extruded at an extrusion rate of 7.8 g/min. The extrusion temperature was 160° C., and a reel speed of 100 m/min. was employed.

The hollow fiber thus obtained before stretching was subjected to a heat treatment for a duration of 12 hours in an air having a temperature of 115° C. while the hollow fiber remaining on a bobbin. The heat treated fiber was further subjected to a stretching of 80% in rollers kept at a temperature of not more than 30° C., followed by being subjected to a hot stretching in rollers in a oven heated to a temperature of 95° C. to have the total stretching of 300%. The heat treated hollow fiber was further subjected to a hot setting while the stretching being at 25% less than the total stretching in a oven heated to 120° C. to have a porous membrane. A hydrophilyzing treatment was employed in the same manner as that of example 1. The membrane characteristics of microporous hollow fiber membrane thus obtained are shown in Table 1.

COMPARISON 2

A microporous hollow fiber membrane was obtained in the same manner as that of example 1 except that a stretching temperature of 107° C. was employed. The membrane characteristics of the microporous membrane thus obtained are shown in Table 1.

COMPARISON 3

A microporous membrane was obtained in the same manner as that of comparison 1 except that a total stretching of 400% and a temperature of 110° C. were employed. The membrane characteristics of the microporous membrane thus obtained are shown in Table 1.

COMPARISON 4

By using a nozzle similar to that of comparison 1, polypropylene having a density of 0.91 g/cm$^3$ and a MI value of 1.0 was extruded at an extrusion rate of 9.0 g/min. and at an extrusion temperature of 200° C., and a reel speed of 580 m/min. was employed. The hollow fiber thus obtained before stretching was subjected to a cold stretching by 26% in rollers kept at a temperature of not more than 30° C., followed by a hot stretching in rollers in a oven heated to 140° C. to have a total stretching of 122%. The heat treated fiber was further subjected to a hot setting while the stretching being 22% less than the total stretching in a oven heated to 143° C. to have a precursor of microporous membrane. The same hydrophilyzing treatment as that of example 1 was employed. The membrane characteristics of microporous membrane thus obtained are shown in Table 1.

FIELD OF INDUSTRIAL APPLICATIONS

As explained in detail herein above, the microporous membrane of the present invention is a hydrophilic composite microporous membrane having a high separation, a high flux, a high membrane strength and a permanent hydrophilic characteristic. Furthermore, a layer having mainly micropores to provide a separation function can be provided at any position along the cross section of the membrane, thereby making the membrane suitable for filtration of various solutions that needs to be treated.

TABLE 1

| | Mean Distance Between Microfibril Bundles (µm) | | | Mean Distance Between Knotted Portions (µm) | | Internal Diameter (µm) | Membrane Thickness of A-Layer (µm) | Total Membrane Thickness (µm) | Membrane Thickness of A-Layer/ Total Membrane Thickness | EVOH Adhesion (WT %) | Mean Particle Diameter at which not less than 90% is cut (µm) | Maximum Pore Diameter by B.P. Method (µm) | Porosity (%) | Permeability (1/m$^2$.hr. mm Hg) |
|---|---|---|---|---|---|---|---|---|---|---|---|---|---|---|
| | Da | Db | Db/Da | La | Lb | | | | | | | | | |
| Ex. 1 | 0.17 | 0.33 | 1.94 | 0.32 | 0.54 | 278 | 10 | 62 | 0.161 | 8.7 | 0.055 | 0.09 | 64 | 1.30 |
| Ex. 2 | 0.35 | 0.54 | 1.54 | 0.77 | 1.00 | 458 | 8 | 84 | 0.095 | 10.5 | 0.170 | 0.30 | 76 | 8.70 |
| Ex. 3 | 0.19 | 0.33 | 1.74 | 0.33 | 0.55 | 280 | 4 | 60 | 0.067 | 7.8 | 0.065 | 0.10 | 64 | 1.60 |
| Ex. 4 | 0.21 | 0.39 | 1.86 | 0.38 | 0.76 | 281 | 12 | 62 | 0.192 | 8.5 | 0.088 | 0.14 | 70 | 2.90 |

TABLE 1-continued

| | Mean Distance Between Microfibril Bundles (μm) | | | Mean Distance Between Knotted Portions (μm) | | Internal Diameter (μm) | Membrane Thickness of A-Layer (μm) | Total Membrane Thickness (μm) | Membrane Thickness of A-Layer/ Total Membrane Thickness | EVOH Adhesion (WT %) | Mean Particle Diameter at which not less than 90% is cut (μm) | Maximum Pore Diameter by B.P. Method (μm) | Porosity (%) | Permeability (1/m².hr. mm Hg) |
|---|---|---|---|---|---|---|---|---|---|---|---|---|---|---|
| | Da | Db | Db/Da | La | Lb | | | | | | | | | |
| Ex. 5 | 0.20 | 0.40 | 2.00 | 0.38 | 0.75 | 276 | 10 | 61 | 0.164 | 8.7 | 0.088 | 0.17 | 60 | 2.60 |
| Ex. 6 | 0.27 | 0.47 | 1.74 | 0.46 | 0.94 | 456 | 11 | 83 | 0.133 | 10.2 | 0.115 | 0.24 | 75 | 5.30 |
| Ex. 7 | 0.10 | 0.21 | 2.10 | 0.20 | 0.40 | 278 | 4 | 61 | 0.065 | 11.0 | 0.038 | 0.04 | 68 | 0.16 |
| Ex. 8 | 0.23 | 0.54 | 2.35 | 0.40 | 1.01 | 456 | 10 | 85 | 0.118 | 10.4 | 0.102 | 0.19 | 76 | 4.30 |
| Ex. 9 | 0.17 | 0.53 | 3.12 | 0.33 | 1.00 | 458 | 8 | 83 | 0.096 | 10.5 | 0.065 | 0.10 | 76 | 2.30 |
| Ex. 10 | 0.35 | 0.56 | 1.60 | 0.75 | 1.03 | 280 | 8 | 61 | 0.132 | 8.5 | 0.170 | 0.30 | 76 | 5.70 |
| Con. 1 | 0.17 | | | 0.31 | | 281 | | 63 | | 9.0 | 0.055 | 0.09 | 58 | 0.24 |
| Con. 2 | 0.20 | | | 0.38 | | 279 | | 60 | | 8.5 | 0.088 | 0.15 | 62 | 0.65 |
| Con. 3 | 0.34 | | | 0.75 | | 278 | | 61 | | 8.8 | 0.170 | 0.30 | 69 | 3.30 |
| Con. 4 | 0.11 | | | 0.21 | | 275 | | 62 | | 11.0 | 0.038 | 0.04 | 45 | 0.04 |

What we claim is:

1. A composite microporous polyolefin membrane comprising a microporous a-layer and a microporous b-layer, said microporous b-layer providing a reinforcing function and being bonded to at least one surface of said microporous a-layer providing a separation function, and wherein each layer of a-layer and b-layer comprises a multilayered body having elliptic micropores, said elliptic micropores comprising a plurality of microfibril bundles and knotted portions of stacked lamella connected at both ends of said microfibril bundles, said elliptic micropores being interconnected from one surface of said composite microporous membrane to an opposing surface of said composite microporous membrane, said microfibril bundles and said knotted portions of stacked lamella forming said elliptic micropores of said microporous membrane being coated with from 3 to 30% by weight of a hydrophilic copolymer per 100% by weight of a precursor of said composite microporous membrane, and the ratio of a mean distance Da between said microfibril bundles in elliptic micropores existing in said a-layer to a mean distance Db between said microfibril bundles in elliptic micropores existing in said b-layer being in the range of $1.3 \leq Db/Da \leq 1.5$.

2. A composite microporous polyolefin membrane according to claim 1, wherein, said microporous b-layer there is a mean distance Db between microfibril bundles in said micropores in said microporous b-layer, wherein Db is from 01 to 1.0 μm.

3. A composite microporous polyolefin membrane according to claim 1 or 2, wherein said microporous b-layer there is a mean distance Lb between said knotted portions of stacked lamella existing in said microporous b-layer, wherein Lb is from 0.4 to 4.0 μm.

4. A composite microporous polyolefin membrane according to claim 1, wherein said elliptic micropores have a maximum pore diameter obtained by the Bubble Point method of from 0.05 to 1.0 μm.

5. A composite microporous polyolefin membrane according to claim 4, wherein said hydrophilic copolymer is a copolymer having from 20 to 90 mole % (ethylene) monomer units, from 10 to 80 mole % (vinyl alcohol) units and not more than 50 mole % of other monomer units.

6. A composite microporous polyolefin membrane according to claim 1, wherein said hydrophilic copolymer is a copolymer of an ethylene-vinyl alcohol type.

7. A composite microporous polyolefin membrane, according to claim 1 or 2 wherein said composite microporous polyolefin membrane is a hollow fiber membrane having an inner diameter of 5 to 5000 μm and a total membrane thickness of 5 to 500 μm, wherein the thickness of said microporous a-layer is not less than 0.5 μm and not more than ⅓ of said total membrane thickness.

8. A composite microporous membrane according to claim 1, wherein said composite membrane has a rate of water permeation of not less than 0.5 $1/m^2 \cdot hr \cdot mmHg$.

9. A method of producing a composite microporous polyolefin hollow fiber membrane, comprising the steps of:

stretching a composite membrane obtained by composite melt spinning after supplying polyolefin having a melt index value of MIb to form a microporous b-layer, said microporous b-layer providing a reinforcing function, to at least one nozzle for manufacturing hollow fibers, the nozzle having not less than two tubular nozzles provided in a concentric manner;

supplying polyolefin having a melt index value of MIa to form a microporous a-layer, said microporous a-layer providing a separation function, to a nozzle disposed at either one side or in the middle of a nozzle provided for said microporous b-layer, wherein MIa and MIb are in a relationship of MIa<MIb; whereby both said microporous a-layer and said microporous b-layer comprise a multi-layered body of slit-like micropores, said micropores comprising a number of microfibrils and knotted portions of stacked lamella connected at both ends of said microfibrils to thereby form a hollow-membrane precursor;

immersing the hollow-membrane precursor having said micropores interconnected from one surface of said membrane to an opposing surface thereof in an organic solution obtained by solving a hydrophilic copolymer in an organic solvent;

removing said precursor from the organic solution;

leaving said precursor for not less than 30 seconds in an atmosphere having 3% by volume of a vapor of said organic solvent and having a temperature between a room temperature and not more than the boiling point of said organic solvent;

then drying said precursor to thereby obtain said composite microporous polyolefin hollow fiber membrane having said knotted portions of stacked lamella and said microfibril bundles coated with 3 to 30% by weight of a hydrophilic copolymer per 100% by dried weight of said precursor.

10. A method of producing a composite microporous polyolefin hollow fiber membrane, comprising the steps of:

stretching a composite membrane obtained by a composite melt spinning after supplying polyolefin having a density of ρb to at least one nozzle for manufacturing hollow fiber fibers, the nozzle having not less than two tubular nozzles provided in a concentric manner to form a microporous b-layer which provides a reinforcing function;

supplying polyolefin having a density of ρa to to a nozzle disposed at either one side or in the middle of a nozzle provided for said microporous b-layer, wherein ρa and ρb are in a relationship of ρa<ρb, whereby said microporous a-layer is formed;

whereby both said microporous a-layer and said microporous b-layer comprise a multi-layered body of slit-like micropores, said micropores comprising a number of microfibrils and knotted portions of stacked lamella connected at both ends of said microfibrils to thereby form a hollow-membrane precursor;

immersing the hollow-membrane precursor having said micropores interconnected from one surface of said membrane to an opposing surface thereof in an organic solution obtained by solving a hydrophilic copolymer in an organic solvent;

removing said precursor from the organic solution;

leaving said precursor for not less than 30 seconds in an atmosphere having 3% by volume of the vapor of said organic solvent and having a temperature between a room temperature and not more than the boiling point of said organic solvent;

then drying said precursor to thereby obtain said composite microporous polyolefin hollow fiber membrane having said knotted portions of stacked lamella and said microfibril bundles coated with 3 to 30% by weight of a hydrophilic copolymer per 100% by dried weight of said precursor.

11. A method of producing a composite microporous polyolefin hollow fiber membrane, comprising the steps of:

stretching a composite membrane obtained by a composite melt spinning after supplying polyolefin having a density of ρb and a melt index of MIb to to at least one nozzles for manufacturing hollow fibers, the nozzle having not less than two tubular nozzles provided in a concentric manner to thereby form a microporous b-layer providing a reinforcing function;

supplying polyolefin having a density of ρa and a melt index of MIa to to a nozzle disposed at either one side or in the middle of a nozzle provided for b-layer, wherein ρa, MIa, ρb and MIb are in relationships of ρa<ρb and MIa<MIb, respectively to thereby form a microporous a-layer providing a separation function, whereby both microporous a-layer and said microporous b-layer comprise a multi-layered body of slit-like micropores, said micropores comprising a number of microfibrils and knotted portions of stacked lamella connected at both ends of microfibrils to thereby form a hollow membrane precursor;

immersing a hollow-membrane precursor having said micropores interconnected from one surface of said membrane to an opposing surface thereof in an organic solution obtained by solving a hydrophilic copolymer in an organic solvent;

removing said precursor from the organic solution;

leaving said precursor for not less than 30 seconds in an atmosphere having 3% by volume of the vapor of said organic solvent and having a temperature between a room temperature and not more than the boiling point of said organic solvent; and then drying said precursor to thereby obtain said composite microporous polyolefin hollow fiber membrane having knotted portions of stacked lamella and microfibril bundles coated with 3 to 30% by weight of a hydrophilic copolymer per 200% by dried weight of said precursor.

12. A method of producing a composite microporous polyolefin hollow fiber membrane according to claim 9, 10 or 11, wherein said hydrophilic organic solvent or a mixture of said hydrophilic organic solvent and water is used as said organic solvent.

13. A method of producing a composite microporous polyolefin hollow fiber membrane according to claim 12, wherein alcohol having a boiling temperature of not more than 100° C. is used as said hydrophilic organic solvent.

14. A composite microporous polyolefin hollow fiber membrane obtained by a method according to claim 9, 10 or 11, wherein said microporous a-layer there is a mean distance Db/Da between said microfibril bundles of said micropores in said microporous, a-layer and in said microporous b-layer there is a mean distance Db between said microfibril bundles of said micropores in said microporous b-layer, and wherein the ratio of Db/Da is in the range of $1.3 \leq Db/Da \leq 15$.

15. A composite microporous polyolefin hollow fiber membrane obtained by a method according to claim 9, 10 or 11, wherein said microporous b-layer there is a mean distance Db between said microfibril bundles of said micropores in said microporous b-layer, wherein Db is from 0.2 to 1 μm.

* * * * *